(12) United States Patent
Yang et al.

(10) Patent No.: US 7,527,491 B2
(45) Date of Patent: May 5, 2009

(54) ROTARY HOT TOOL AND HEAT ABLATION APPARATUS USING THE SAME

(75) Inventors: Dong Yol Yang, Daejeon (KR); Ha Yong Shin, Daejeon (KR); Hyo Chan Kim, Jeonju-si (KR); Sang Ho Lee, Osan-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 483 days.

(21) Appl. No.: 11/440,651

(22) Filed: May 24, 2006

(65) Prior Publication Data

US 2007/0026100 A1 Feb. 1, 2007

(30) Foreign Application Priority Data

Jun. 27, 2005 (KR) .................. 10-2005-0055690

(51) Int. Cl.
*B29C 67/00* (2006.01)
*B29C 35/00* (2006.01)
(52) U.S. Cl. .................. 425/174; 425/216; 425/471; 425/472
(58) Field of Classification Search .............. 425/174, 425/215, 216, 383, 403, 470, 471, 472; 219/201, 219/216, 221, 228; 83/15, 171
See application file for complete search history.

(56) References Cited

U.S. PATENT DOCUMENTS

| 6,234,725 | B1 | 5/2001 | Campian |
| 7,037,104 | B2 * | 5/2006 | Azzinaro et al. ............... 431/2 |
| 7,303,385 | B2 * | 12/2007 | Yang et al. ................... 425/216 |
| 2005/0017411 | A1 * | 1/2005 | Yang et al. ................... 264/319 |

FOREIGN PATENT DOCUMENTS

| KR | 1020050007687 A | 1/2005 |
| KR | 10-2005-0091492 | 9/2005 |

* cited by examiner

*Primary Examiner*—Robert B Davis
(74) *Attorney, Agent, or Firm*—Graybeal Jackson LLP

(57) ABSTRACT

Disclosed herein is a hot tool which machines a workpiece made of foam material. The hot tool of the present invention includes a motor, a rotary unit which is coupled to the motor, and an electrode terminal which is connected to an outside power supply and contacts an electrode of the rotary unit. The hot tool further includes a heating body which is coupled to the rotary unit so that the heating body is heated by electric current supplied through the electrode terminal, with a spiral groove formed in a circumferential outer surface of the heating body. The hot tool further includes a polymer storage case which is provided at an upper position on the circumferential outer surface of the heating body, so that molten polymer that moves along the spiral groove is stored in the polymer storage case. Therefore, the hot tool of the present invention has increased machining accuracy and prevents a workshop from becoming messy due to molten polymer.

10 Claims, 7 Drawing Sheets

(A)　　　　　　　　(B)

ROTARY HOT TOOL AND HEAT ABLATION APPARATUS USING THE SAME

CROSS-REFERENCE TO RELATED APPLICATION

This is application claims benefit, under 35 USC §119, of co-pending Korean Patent Application No. 2005-55690 filed 27 Jun. 2005 which is incorporated herein by reference.

BACKGROUND OF THE INVENTION

1. Field of the Invention

The present invention relates generally to hot tools to machine workpieces made of foam material and heat ablation apparatuses using the same and, more particularly, to a hot tool having enhanced machining accuracy and minimally discharging pollutants, and a heat ablation apparatus using the same.

2. Description of the Related Art

As well known to those skilled in the art, the manufacture of three-dimensional shapes from foam materials has been widely implemented in mold industries, test product manufacturing industries and design industries. Tools to machine workpieces made of foam material were proposed in U.S. Pat. No. 6,234,725, Korean Patent Application No. 2003-47255 and Korean Patent Application No. 2004-16967.

The tool of U.S. Pat. No. 6,234,725 is a type that cuts foam. Because this type of tool machines foam by cutting it, chips and dust are generated during a machining process. These chips and dust deteriorate working conditions. In consideration of this, in this US Patent, an air passage for the intake of chips and dust is formed in the tool. However, because the tool rotates at a high speed when cutting foam, few chips and little dust are actually drawn through the air passage.

To solve the above-mentioned disadvantages of U.S. Pat. No. 6,234,725, the inventor of the present invention proposed Korean Patent Application Nos. 2003-47255 and 2004-16967. Unlike U.S. Pat. No. 6,234,725, these patents shape foam by melting it, thus preventing chips and dust from being generated.

FIG. 1 shows a hot tool 10 disclosed in Korean Patent Application No. 2003-47255. As shown in FIG. 1, the hot tool 10 of No. 2003-47255 includes a heating wire 11. When voltage is applied to the hot tool 10, the heating wire 11 generates high heat of 700° C. or more and thus melts the surface of a workpiece, disposed adjacent to the heating wire 11, using radiant heat. Because this machining method can machine the workpiece without contact between the hot tool 10 and the workpiece, there is no cutting resistance caused by friction between the workpiece and the tool.

However, in this hot tool of No. 2003-47255, thermal energy is transferred to the workpiece through a medium, that is, the heating wire, having a very small surface area. Thus, the effective machining range, in which the workpiece is substantially pyrolyzed, is too narrow and, consequently, the time required to machine the workpiece is increased. Therefore, if this hot tool is used in a preliminary machining stage in which a relatively large surface area must be machined, only a small part of the workpiece is pyrolyzed, and most of the remaining part merely enters a molten state and may undesirably adhere to the workpiece or the hot tool, thus increasing surface roughness of the workpiece and the machining accuracy of the hot tool.

FIGS. 2A and 2B show a hot tool 20 disclosed in Korean Patent Application No. 2004-16967. FIG. 2A is a perspective view of the hot tool 20, and FIG. 2B is a sectional view of the hot tool 20. As shown in FIG. 2B, electrodes 26 and a heating wire 28, connected to the electrodes 26, are provided in the hot tool 20. The hot tool 20 includes machining parts 22 which protrude outwards from a circumferential outer surface of a shaft body of the hot tool 20, and receiving spaces 24 which receive molten polymer therein. Each machining part 22 protrudes in radial directions such that it contacts a workpiece. Each receiving space 24 has a concave shape such that molten polymer is easily received therein. Polymer melted by the machining parts 22 is received in the receiving spaces 24 and is heated in the receiving spaces 24 for a long time, thus being pyrolyzed. Therefore, in this patent, the time required to machine the workpiece is reduced, and the degree of melting of polymer is decreased, compared to the prior arts.

However, this patent has a disadvantage in that only when the hot tool moves in a longitudinal direction can molten polymer be removed during a machining process. Furthermore, because the hot tool must be heated to a high temperature to rapidly pyrolyze the polymer in the receiving spaces 24, it is very difficult to precisely machine the workpiece made of foam material.

SUMMARY OF THE INVENTION

Accordingly, the present invention has been made keeping in mind the above problems occurring in the prior art, and an object of the present invention is to provide a rotary hot tool which solves problems of deterioration of machining accuracy and reduction in machining speed due to molten polymer, and a heat ablation apparatus using the same.

In an aspect, the present invention provides a rotary hot tool, including: a motor; a rotary unit coupled to the motor and having an electrode connected to a power supply; a heating body coupled to the rotary unit so that the heating body is heated by electric current supplied from the power supply, the heating body having a spiral groove formed in a circumferential outer surface of the heating body; and a polymer storage case provided at an upper position on the circumferential outer surface of the heating body, so that molten polymer that moves along the spiral groove is stored in the polymer storage case.

In another aspect, the present invention provides a heat ablation apparatus, including a rotary hot tool having a plurality of spiral grooves in a circumferential outer surface thereof; a first feed means for moving the rotary hot tool in a direction of a first axis; an indexing table to hold a workpiece thereon; a second feed means for moving at least one of the first feed means and the indexing table in a direction of a second axis perpendicular to the first axis; and a third feed means for moving at least one of the first and second feed means in a direction of a third axis perpendicular to the first and second axes.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

Figure 1:
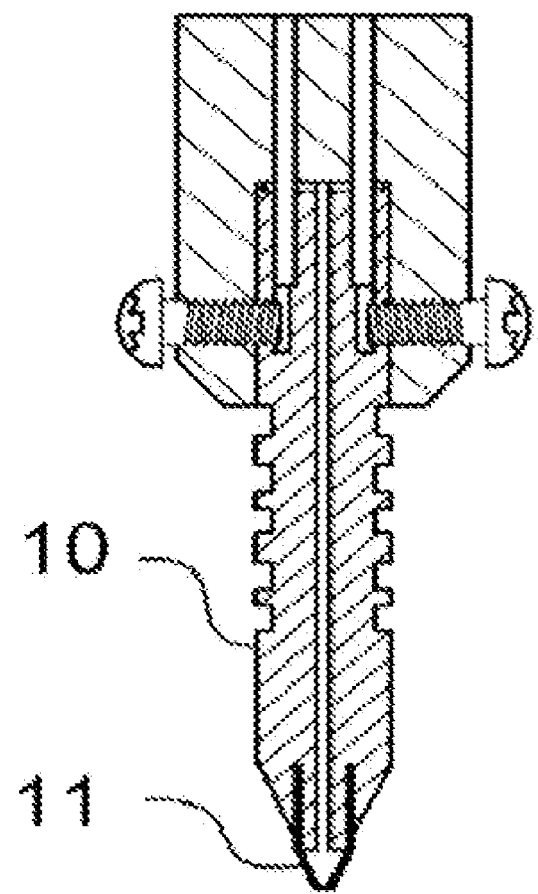
FIG. 1 is a sectional view showing a conventional hot tool.
Figure 2:
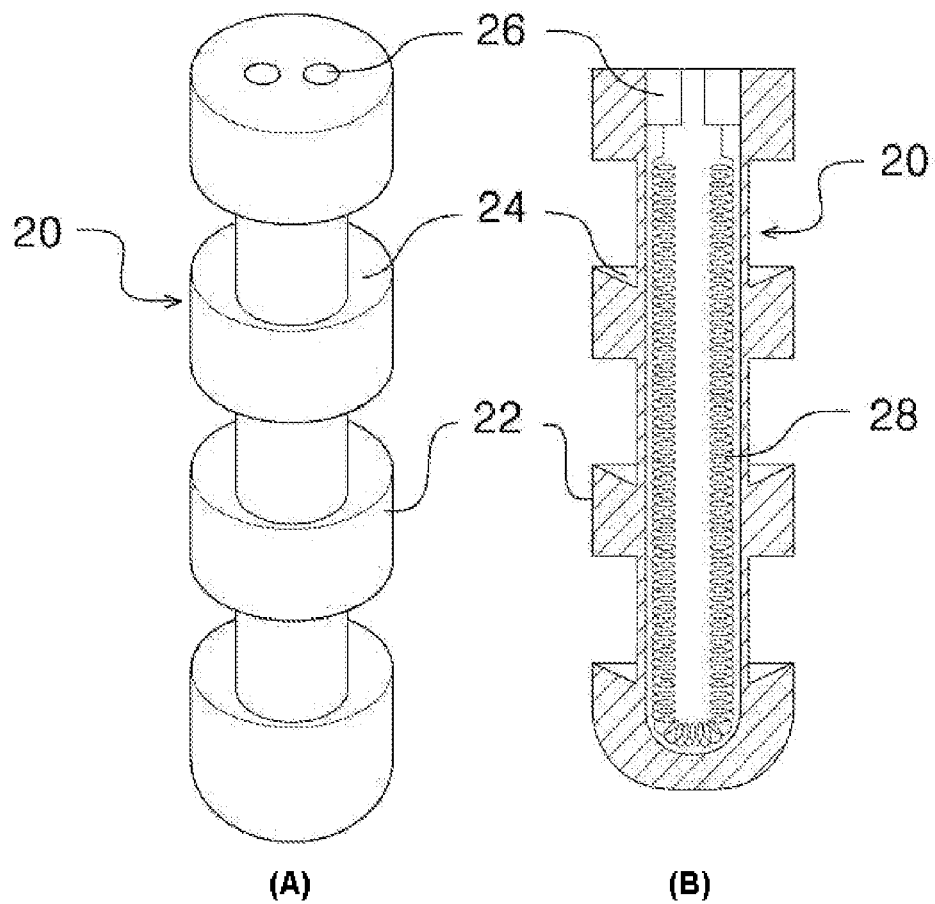
FIGS. 2A and 2B are views showing another conventional hot tool.
Figure 3:
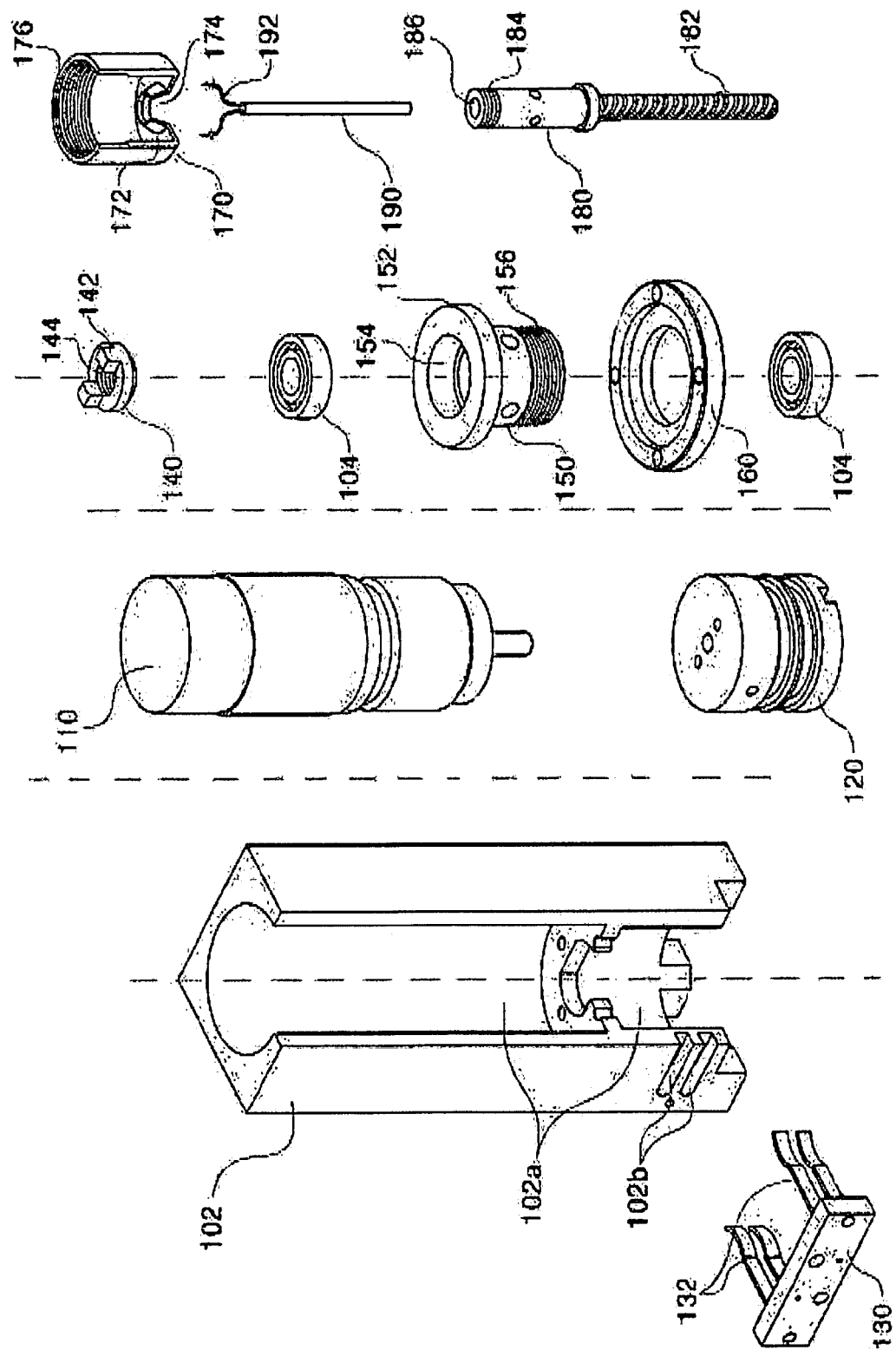
FIG. 3 is an exploded perspective view showing an embodiment of a rotary hot tool according to the present invention.
Figure 4:
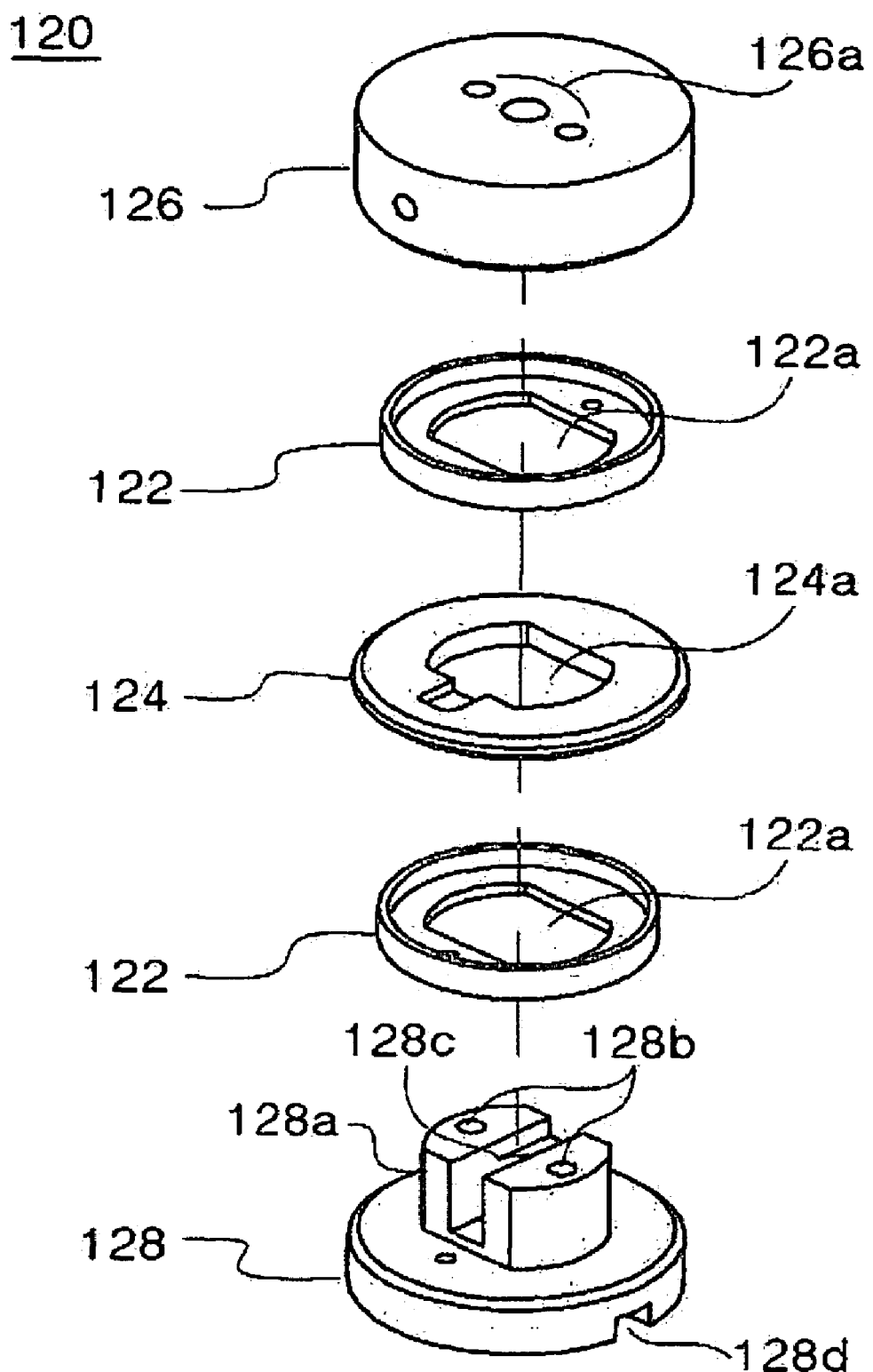
FIG. 4 is an exploded perspective view showing a rotary unit of the rotary hot tool of FIG. 3.

FIG. 3 is an exploded perspective view showing an embodiment of a rotary hot tool 100 according to the present invention. FIG. 4 is an exploded perspective view showing a rotary unit 120 of the rotary hot tool 100 of FIG. 3.

As shown in FIG. 3, the rotary hot tool 100 includes a casing 102, a motor 110, the rotary unit 120, an electrode terminal 130, a holder 150, a polymer storage case 170 and a heating body 180.

The casing 102 has two receiving chambers 102a which are separated from each other. The motor 110 and the rotary unit 120 are provided in the respective receiving chambers 102a. Insertion slots 102b, which communicate with the lower receiving chamber 102a, are formed through a sidewall of the casing 102. The electrode terminal 130 is inserted into the insertion slots 102b.

As shown in FIG. 4, the rotary unit 120 includes two circular electrodes 122, an insulation member 124, an upper chuck 126, and a lower chuck 128. The two circular electrodes 122 and the insulation member 124 are assembled together using the upper and lower chucks 126 and 128. The insulation member 124 is interposed between the two circular electrodes 122 to prevent electricity from flowing between the two circular electrodes 122. Through holes 122a and 124a are respectively formed at central portions through each circular electrode 122 and the insulation member 124. Three coupling holes 126a are formed through the upper chuck 126. A shaft of the motor 110 is inserted into the medial coupling hole 126a. Locking bolts are tightened into the two remaining coupling holes 126a. A boss part 128a, which protrudes a predetermined length upwards, is provided on the lower chuck 128. Coupling holes 128b are formed in the boss part 128a at positions corresponding to the coupling holes 126a of the upper chuck 126. A lead hole 128c is formed through the boss part 128a between the coupling holes 128b. The boss part 128a is in close contact with the lower surface of the upper chuck 128 after passing through the through holes 122a and 124a of the circular electrodes 122 and the insulation member 124. An insertion groove 128d, which extends both ways in a radial direction of the lower chuck 128, is formed in a lower surface of the lower chuck 128. A socket 140 is fitted into the insertion groove 128d. The upper chuck 126 and the lower chuck 128 are securely coupled to each other by the locking bolts tightened into the coupling holes 126a and 128b.

The remaining elements will be explained with reference to FIG. 3.

The electrode terminal 130 has two pairs of electric contact terminals 132. The electric contact terminals 132 of each pair contact the respective circular electrodes 122. Each electric contact terminal 132 has elasticity in an inward direction such that the electric contact terminal 132 reliably contacts the associated circular electrode 122. The electrode terminal 130 is connected to an outside power supply. Therefore, the circular electrodes 122 are supplied with electric current from the outside power supply through the electrode terminal 130.

The socket 140 includes protrusions 142 which extend predetermined lengths upwards. A coupling hole 144 is formed through the socket 140 between the protrusions 142. An internal thread is formed around the coupling hole 144. The heating body 180 is tightened into the coupling hole 144. The protrusions 142 of the socket 140 are fitted into the insertion groove 128d of the lower chuck 128, so that the socket 140 is coupled to the lower chuck 128 and is rotated along with the rotary unit 120.

The holder 150 has a stepped part 152 which protrudes outwards from a circumferential outer surface of an upper end of the holder 150. A through hole 154 is formed through the holder 150. A bearing 104 is coupled to each of the upper and lower ends of the holder 150. An external thread 156 is formed on the circumferential outer surface of the lower end of the holder 150. The polymer storage case 170 engages with the external thread 156. The holder 150 is mounted to the casing 102 by a flange member 160 coupled to a lower end of the casing by locking bolts.

The polymer storage case 170 has a receiving chamber 172 in which molten polymer is stored. A through hole 174 is formed through the bottom of the polymer storage case 170. An internal thread 176 is formed around a circumferential inner surface of an upper end of the polymer storage case 170.

The heating body 180 has a plurality of spiral grooves 182 thereon. Each spiral groove 182 has a predetermined length and extends from a lower end of the heating body 180 towards an upper end. An external thread 184 is formed around the upper end of the heating body 180. A hole 186, which is open upwards, is formed in the upper end of the heating body 180. A resistance member 190, which generates high heat, is inserted into the hole 186 of the heating body 180. The heating body 180 is coupled to the rotary unit 120 through the socket 140 and is rotated by the operation of the motor 110. Because the bearings 104 are mounted to the holder 150, when the heating body 180 is rotated, frictional resistance is reduced.

The resistance member 190 has two wires 192. The two wires 192 are connected to respective circular electrodes 122. When electric current is applied to the circular electrodes 122 through the electrode terminal 130, the resistance member 190 is heated to a high temperature, thus heating the heating body 180.

The operation of the rotary hot tool 100 according to this embodiment of the present invention will be explained herein below.

Figure 5:
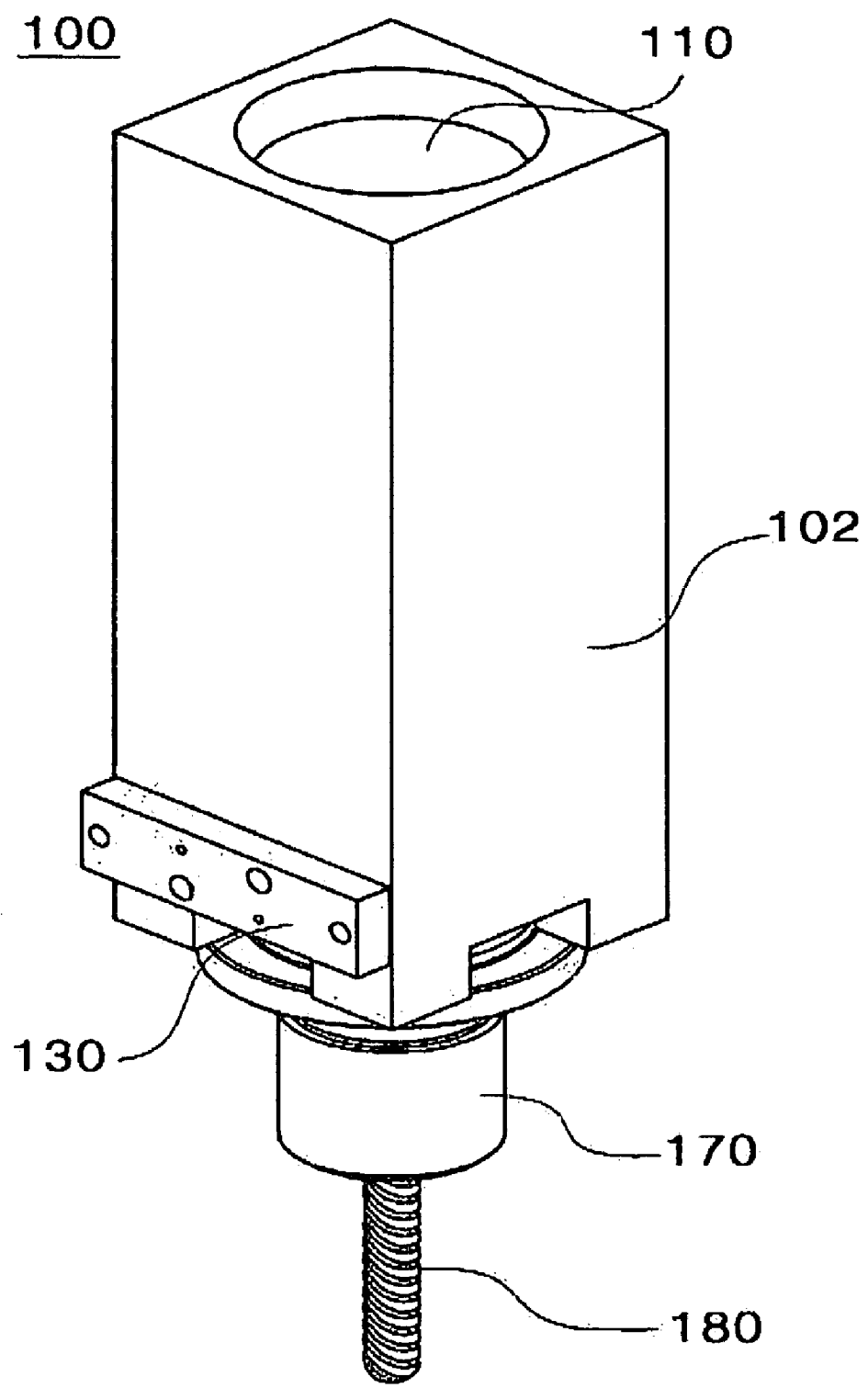
FIG. 5 is a perspective view of the assembled rotary hot tool of FIG. 3.
Figure 6:
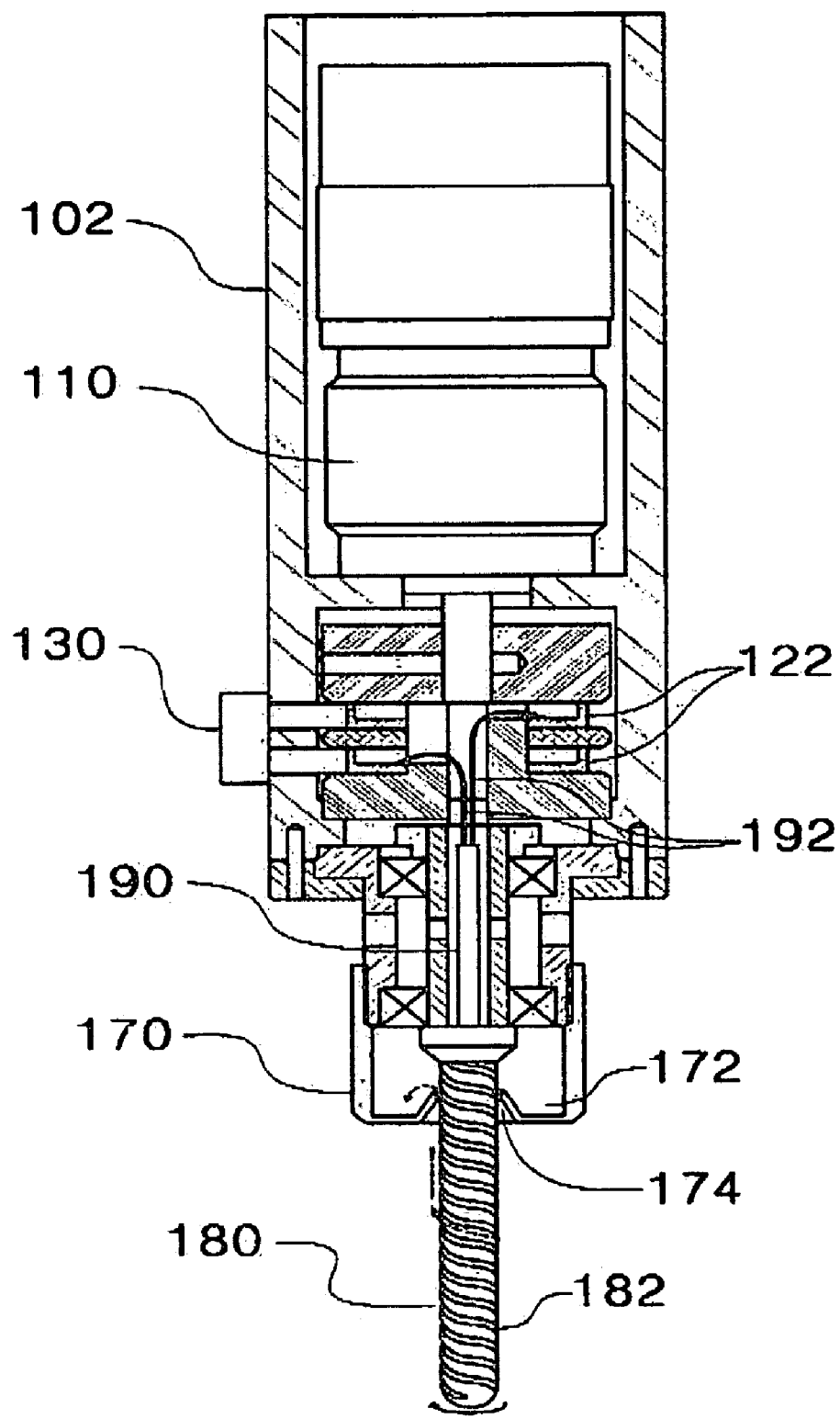
FIG. 6 is a sectional view showing the rotary hot tool of FIG. 3.

FIG. 5 is a perspective view of the assembled rotary hot tool 100 of FIG. 3. FIG. 6 is a sectional view showing the rotary hot tool 100 of FIG. 3.

The assembly of the rotary hot tool 100, which consists of the above-mentioned elements, is shown in FIG. 5. The motor 110 and the electrode terminal 130 are connected to a separate outside power supply (not shown). When electric current is applied to the motor 110, the rotary unit 120 coupled to the motor 110 is rotated, and the heating body 180 is rotated along with the rotary unit 120 through the socket 140. When electric current is applied to the electrode terminal 130, the resistance member 190, which is placed in the heating body 180, generates high heat using the electric current supplied to the resistance member 190 through the circular electrodes 122 of the rotary unit 120. As such, when electric current is applied to the motor 110 and the electric terminal 130, the heating body 180 is rotated and heated to a high temperature.

When a workpiece made of foam material is ablated by the heating body 180, the workpiece is melted by the thermal energy of the heating body 180 while being ablated. Molten polymer is moved towards the polymer storage case 170 along the grooves 182 of the heating body 180 both by the rotating force of the heating body 180 and by a capillary phenomenon. Because the molten polymer is continuously supplied with thermal energy from the heating body 180 while the molten polymer moves along the grooves 182, the molten polymer may be pyrolyzed while moving towards the polymer storage case 170, or the molten polymer may be pyrolyzed in the polymer storage case 170, after being supplied with sufficient thermal energy.

Meanwhile, because the polymer storage case 170 is filled with a relatively large amount of molten polymer, a separate heating unit may be provided around the polymer storage case 170 to pyrolyze molten polymer in the polymer storage case 170. Furthermore, preferably, a discharge tube may be provided to discharge the molten polymer outside of the rotary hot tool 100.

Figure 7:
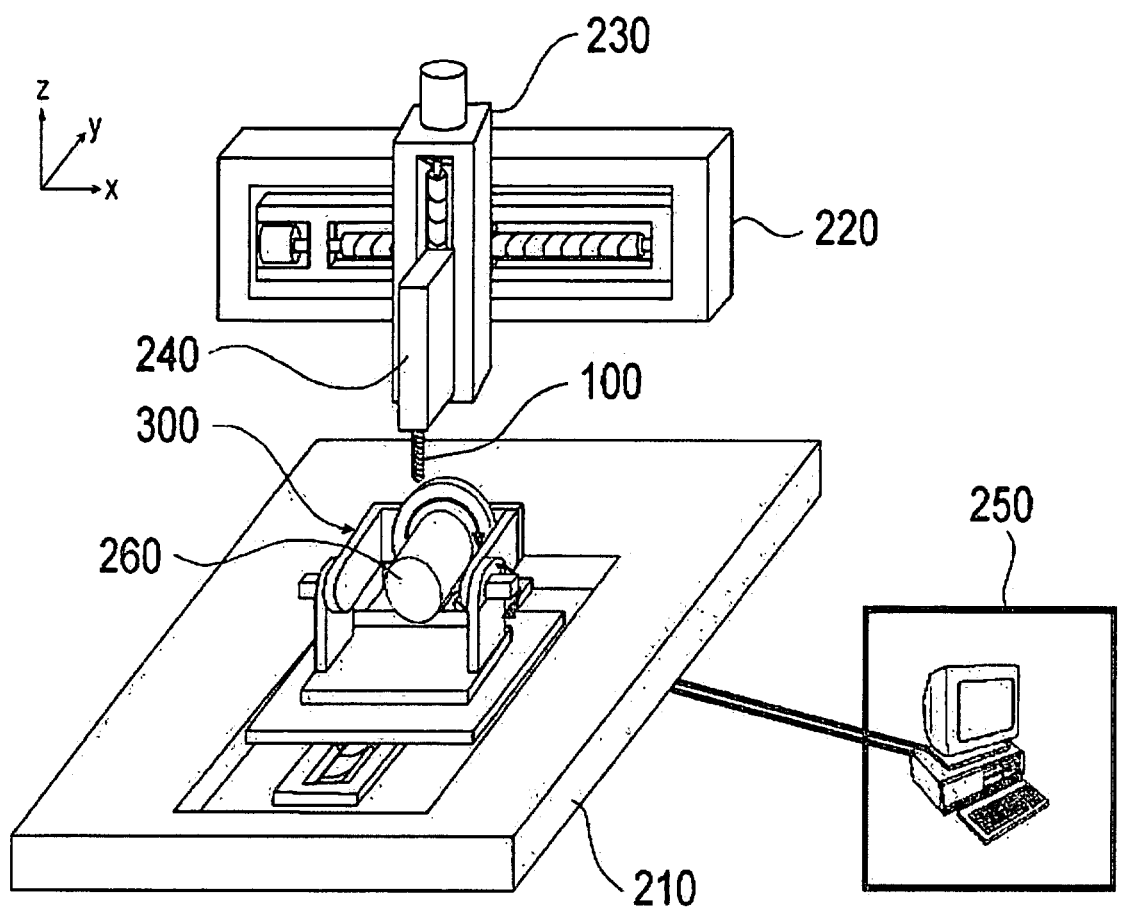
FIG. 7 is a perspective view showing an embodiment of a heat ablation apparatus having the rotary hot tool of FIG. 3.

FIG. 7 is a perspective view showing an embodiment of a heat ablation apparatus having the rotary hot tool 100 of FIG. 3.

As shown in FIG. 7, the heat ablation apparatus having the rotary hot tool 100 according to the present invention includes a first feed unit 210, a second feed unit 220, a third feed unit 230, an indexing table 300 which holds a workpiece 260, and a control unit 250 which controls the operation of the above-mentioned elements.

The indexing table 300 which holds the workpiece 260 thereon is placed on the first feed unit 210. The first feed unit 210 carries the indexing table 300 in a direction of a first axis (a y-axis of FIG. 7) parallel to the horizontal plane. The second feed unit 220 is provided at a position spaced apart from the first feed unit 210 by a predetermined height. The second feed unit 220 moves the third feed unit 230 in a direction of a second axis (an x-axis of FIG. 7) perpendicular to the direction in which the first feed unit 210 moves.

Furthermore, a vice 240 is mounted to the third feed unit 230. The third feed unit 230 is provided on the second feed unit 220 and moves the vice 240 in a direction of a third axis (a z-axis of FIG. 7) perpendicular both to the first axis and to the second axis.

The rotary hot tool 100 is coupled to the vice 240. The vice 240 moves depending on the operation of the second and third feed units 220 and 230 in a direction parallel to the horizontal plane and perpendicular to the direction in which the first feed unit 210 moves, or in a direction moving towards or away from the first feed unit 210.

Therefore, the movement path of the rotary hot tool 100 in the y-axis direction is ensured by the first feed unit 210 which moves the indexing table 300, and movement paths of the rotary hot tool 100 in the x and z-axis directions are ensured by the second and third feed units 220 and 230. As a result, the rotary hot tool 100 has a three-dimensional machining range with respect to the workpiece 260 held on the indexing table 300. Therefore, the heat ablation apparatus of the present invention can form the workpiece 260 into a three-dimensional shape.

Meanwhile, the first, second and third feed units 210, 220 and 230 and the indexing table 300 are moved along desired paths under the control of the control unit 250 connected to them through a wired or wireless connection, thus making it possible for the rotary hot tool 100 to machine the workpiece 260.

As described above, the rotary hot tool of the present invention has the following advantages.

First, the efficiency of removal of molten polymer is markedly increased. In the present invention, because a plurality of spiral grooves is formed in a circumferential outer surface of a heating body, molten polymer is pyrolyzed while moving upwards along the spiral grooves and is stored in a polymer storage case. Therefore, the present invention is advantageous in that polymer melted by the heating body is easily removed.

Second, the machining accuracy of a workpiece made of foam material is markedly enhanced and the surface roughness thereof is reduced. In the present invention, because molten polymer is moved to the polymer storage case along the spiral grooves of the rotary hot tool, as described above, molten polymer seldom contacts the workpiece. Therefore, the present invention prevents machining accuracy from being deteriorated and surface roughness from being increased by the molten polymer.

Third, thermal efficiency is increased. In the present invention, because the rotary hot tool is rotated around one axis, the contact surface area between the rotary hot tool and the workpiece is increased. Therefore, the present invention markedly reduces the quantity of heat loss due to radiation into air, compared to the conventional arts.

Although the technical idea of a rotary hot tool and a heat ablation apparatus using the same according to the present invention have been disclosed for illustrative purposes, this merely illustrates a preferred embodiment of the present invention, but does not limit the present invention. Furthermore, those skilled in the art will appreciate that various modifications, additions and substitutions are possible, without departing from the scope and spirit of the invention as disclosed in the accompanying claims.

What is claimed is:

1. A rotary hot tool, comprising:
  a motor;
  a rotary unit coupled to the motor and having an electrode connected to a power supply;
  a heating body coupled to the rotary unit so that the heating body is heated by electric current supplied from the power supply, the heating body having a spiral groove formed in a circumferential outer surface; and
  a polymer storage case provided at an upper position on the circumferential outer surface of the heating body, so that molten polymer that moves along the spiral groove is stored in the polymer storage case.

2. The rotary hot tool as set forth in claim 1, wherein the rotary unit comprises:
  an upper chuck coupled to the motor;
  the electrode, which comprises two circular electrodes with a through hole formed through each of the two circular electrodes;
  an insulation member provided between the two circular electrodes, with a through hole formed through the insulation member; and
  a lower chuck coupled to the upper chuck, with a boss part provided on the lower chuck and passing through the through holes of the circular electrodes and the insulation member.

3. The rotary hot tool as set forth in claim 1, wherein the heating body has a receiving space therein, and the rotary hot tool further comprises;
  a resistance member provided in the receiving space of the heating body and connected to the electrode of the rotary unit, thus generating heat.

4. The rotary hot tool as set forth in claim 1, further comprising:
  a separate resistance member provided in the polymer storage case to generate high heat.

5. The rotary hot tool as set forth in claim 2, further comprising:

a separate resistance member provided in the polymer storage case to generate high heat.

6. The rotary hot tool as set forth in claim 3, further comprising:

a separate resistance member provided in the polymer storage case to generate high heat.

7. The rotary hot tool as set forth in claim 1, further comprising:

a discharge tube coupled to the polymer storage case to discharge molten polymer from the polymer storage case to an outside.

8. The rotary hot tool as set forth in claim 2, further comprising:

a discharge tube coupled to the polymer storage case to discharge molten polymer from the polymer storage case to an outside.

9. The rotary hot tool as set forth in claim 3, further comprising:

a discharge tube coupled to the polymer storage case to discharge molten polymer from the polymer storage case to an outside.

10. A heat ablation apparatus, comprising:

a rotary hot tool, comprising: a motor; a rotary unit coupled to the motor and having an electrode connected to a power supply; a heating body coupled to the rotary unit so that the heating body is heated by electric current supplied from the power supply, the heating body having a spiral groove formed in a circumferential outer surface; and a polymer storage case provided at an upper position on the circumferential outer surface of the heating body, so that molten polymer that moves along the spiral groove is stored in the polymer storage case;

first feed means for moving the rotary hot tool in a direction of a first axis;

an indexing table to hold a workpiece thereon;

second feed means for moving at least one of the first feed means and the indexing table in a direction of a second axis perpendicular to the first axis; and third feed means for moving at least one of the first and second feed means in a direction of a third axis perpendicular to the first and second axes.

* * * * *